United States Patent
Loerincz et al.

(10) Patent No.: US 11,563,399 B2
(45) Date of Patent: Jan. 24, 2023

(54) OPERATING A BRUSHLESS DC MOTOR

(71) Applicant: Conti Temic microelectronic GmbH, Nuremberg (DE)

(72) Inventors: Robert Istvan Loerincz, Chisoda (RO);
Marc Arabackyj, Nuremberg (DE);
Edgar Jerichow, Nuremberg (DE);
Mathias Kuhn, Eckental (DE);
Thomas Gürtler, Nuremberg (DE);
Andreas Pschorr, Regensburg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 17/309,269

(22) PCT Filed: Sep. 13, 2019

(86) PCT No.: PCT/EP2019/074596
§ 371 (c)(1),
(2) Date: May 13, 2021

(87) PCT Pub. No.: WO2020/098994
PCT Pub. Date: May 22, 2020

(65) Prior Publication Data
US 2022/0006415 A1 Jan. 6, 2022

(30) Foreign Application Priority Data
Nov. 13, 2018 (DE) ...................... 10 2018 219 331.2

(51) Int. Cl.
*H02P 29/024* (2016.01)

(52) U.S. Cl.
CPC .................................. *H02P 29/024* (2013.01)

(58) Field of Classification Search
CPC ....... H02P 29/024; H02P 3/00; H02H 7/0811; H02K 29/00
(Continued)

(56) References Cited

U.S. PATENT DOCUMENTS 5,757,147 A 5/1998 Blumor et al.
6,832,121 B1 12/2004 Albrecht et al.
(Continued)

FOREIGN PATENT DOCUMENTS

DE 19520642 C1 12/1996
DE 19908230 A1 8/2000
(Continued)

OTHER PUBLICATIONS

German Search Report dated Jul. 11, 2019 for the counterpart German Patent Application No. 10 2018 219 331.2.
(Continued)

*Primary Examiner* — David Luo

(57) ABSTRACT

A motor control apparatus for a three-phase brushless DC motor. The motor control apparatus comprises a power converter which has, for each phase of the brushless DC motor, an electrical half-bridge having two electronic switches, and an application-specific integrated circuit for actuating the electronic switches of the power converter. The application-specific integrated circuit can be controlled by a programmable control unit in a normal mode, has a first interface for receiving an error signal signaling a malfunction and is designed to change the power converter to a defined final operating state independently of the programmable control unit after receiving the error signal.

8 Claims, 2 Drawing Sheets

(58) Field of Classification Search
USPC .............................................. 318/434, 400.01
See application file for complete search history.

(56) References Cited

U.S. PATENT DOCUMENTS

| | | | |
|---|---|---|---|
| 7,719,223 B2 * | 5/2010 | Grasso | H02P 6/182 |
| | | | 318/599 |
| 10,886,870 B2 * | 1/2021 | Baurle | H02P 29/027 |
| 2016/0079906 A1 | 3/2016 | Arabackyj et al. | |
| 2016/0149533 A1 | 5/2016 | Loerincz | |

FOREIGN PATENT DOCUMENTS

| | | |
|---|---|---|
| DE | 102007031429 A1 | 1/2009 |
| DE | 102013220979 A1 | 11/2014 |
| DE | 102013220995 A1 | 12/2014 |
| EP | 2793129 A2 | 10/2014 |
| WO | 2014173792 A2 | 10/2014 |

OTHER PUBLICATIONS

International Search Report and the Written Opinion of the International Searching Authority dated Dec. 16, 2019 for the counterpart PCT Application No. PCT/2019/074596.

\* cited by examiner

OPERATING A BRUSHLESS DC MOTOR

CROSS REFERENCE TO RELATED APPLICATIONS

This U.S. patent application claims the benefit of PCT patent application No. PCT/EP2019/074596, filed Sep. 13, 2019, which claims the benefit of German patent application No. 10 2018 219 331.2, filed Nov. 13, 2018, both of which are hereby incorporated by reference.

BACKGROUND

The invention relates to a motor control apparatus and to a method for operating a three-phase brushless DC motor.

Safety-relevant systems must be changed to a safe operating state in the event of a dangerous malfunction. For example, the ISO 26262 standard specifies safety integrity levels ASIL (=automotive safety integrity level) for safety-relevant systems in motor vehicles.

In some applications with electronically controlled brushless DC motors, a safe system state is achieved, for example, by actively moving the brushless DC motor to a predefined operating state, for example a decoupled state in the case of a transmission actuator. Alternatively, the system can be moved to a safe operating state using mechanical means, for example by decoupling by means of a spring, or using microcontroller support, but this partially considerably reduces the probability of achieving operating states of high safety integrity levels in the event of malfunctions of the electronic drive control system.

WO 2014/173792 A2 discloses a method for operating a three-phase brushless DC motor using electronic commutation controlled by pulse width modulation in the event of a malfunction. After the malfunction has been signaled, the rotor of the brushless DC motor is rotated in a predefined motor direction of rotation with a predefined maximum number of commutation steps and the brushless DC motor is then changed to a selected final operating state.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The invention is based on the object of specifying an improved motor control apparatus and an improved method for safely operating a brushless DC motor in the event of a malfunction.

A motor control apparatus for a three-phase brushless DC motor comprises a power converter which has an electrical half-bridge having two electronic switches for each phase of the brushless DC motor, and an application-specific integrated circuit for actuating the electronic switches of the power converter. The application-specific integrated circuit can be controlled by a programmable control unit in a normal mode, has a first interface for receiving an error signal signaling a malfunction and is designed to change the power converter to a defined final operating state independently of the programmable control unit after receiving the error signal.

The motor control makes it possible, in the event of a safety-relevant malfunction, to change a brushless DC motor to a safe operating state, which is defined by a final operating state of the power converter, without the support of a programmable control unit, actively and in a manner controlled directly by an application-specific integrated circuit which actuates the electronic switches of the power converter. This prevents, in particular, the situation in which the safe operating state is prevented from being reached as a result of errors in the programmable control unit, such as undesirable bit flips.

In one configuration, the application-specific integrated circuit has a braking bit register for setting a braking bit and a counting register for storing a count value for commutations which change the switching state of the power converter and is designed, if the braking bit is set when the error signal is received, to immediately change the power converter to the final operating state if the count value is greater than zero and, before changing the power converter to the final operating state, to change the power converter to a braking mode for braking the brushless DC motor for a defined braking period if the count value is zero.

The above-mentioned configuration enables controlled braking of the brushless DC motor before the motor is changed to the safe operating state provided that the braking is provided by setting the braking bit and the braking operation is not hindered by any rotations of the motor which are provided by the count value of the counting register.

In a further configuration, the application-specific integrated circuit also has a second interface for receiving at least one sensor signal indicating a rotor position of a rotor of the brushless DC motor and is designed, if the braking bit is not set and the count value is greater than zero when the error signal is received, to change the switching state of the power converter by means of at least one commutation before changing the power converter to the final operating state and to check after each commutation whether the commutation has changed the rotor position of the rotor and to decrement the count value by one in the event of a change in the rotor position until the count value is zero.

The above-mentioned configuration makes it possible for rotations of the motor which are provided according to the count value of the counting register to be carried out before the motor is changed to the safe operating state.

In a further configuration, the application-specific integrated circuit has a timer and is designed to start the timer after receiving the error signal and to change the power converter to the final operating state after the expiry of a defined period since starting the timer.

The above-mentioned configuration of makes it possible to change the motor to the safe operating state at the latest after the expiry of the period, in particular even when, for example, the rotor of the brushless DC motor may be blocked and therefore cannot be rotated further and a number of rotor rotations predefined by the count value of the counting register therefore cannot be performed.

In a further configuration, all electronic switches are switched off in the final operating state of the power converter. This enables freewheeling of the rotor of the brushless DC motor and therefore a safe operating state of the motor.

In the method for operating a three-phase brushless DC motor using a motor control apparatus, each phase of the brushless DC motor is connected to an electrical half-bridge of the power converter, the electronic switches of the power converter are actuated using the application-specific integrated circuit, the application-specific integrated circuit is controlled by a programmable control unit in a normal mode, and the power converter is changed to the defined final operating state by the application-specific integrated circuit independently of the programmable control unit after receiving the error signal.

In one configuration of the method, the application-specific integrated circuit has a braking bit register for setting a braking bit and a counting register for storing a count value for commutations which change the switching state of the power converter, and, if the braking bit is set when the error signal is received, the power converter is immediately changed to the final operating state by the application-specific integrated circuit if the count value is greater than zero and, before being changed to the final operating state, the power converter is changed to a braking mode for braking the brushless DC motor for a defined braking period if the count value is zero.

In a further configuration of the method, the application-specific integrated circuit has a second interface for receiving at least one sensor signal indicating a rotor position of a rotor of the brushless DC motor, and, if the braking bit is not set and the count value is greater than zero when the error signal is received, the switching state of the power converter is changed by the application-specific integrated circuit by means of at least one commutation before changing the power converter to the final operating state and it is checked after each commutation whether the commutation has changed the rotor position of the rotor, and the count value is decremented by one in the event of a change in the rotor position until the count value is zero.

In a further configuration of the method, the application-specific integrated circuit has a timer, and the timer is started by the application-specific integrated circuit after receiving the error signal, and the power converter is changed to the final operating state after the expiry of a defined period since starting the timer.

In a further configuration of the method, all electronic switches are switched off in the final operating state of the power converter.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Exemplary embodiments of the invention are explained in more detail below with reference to drawings.

In the drawings.

DETAILED DESCRIPTION

Figure 1:
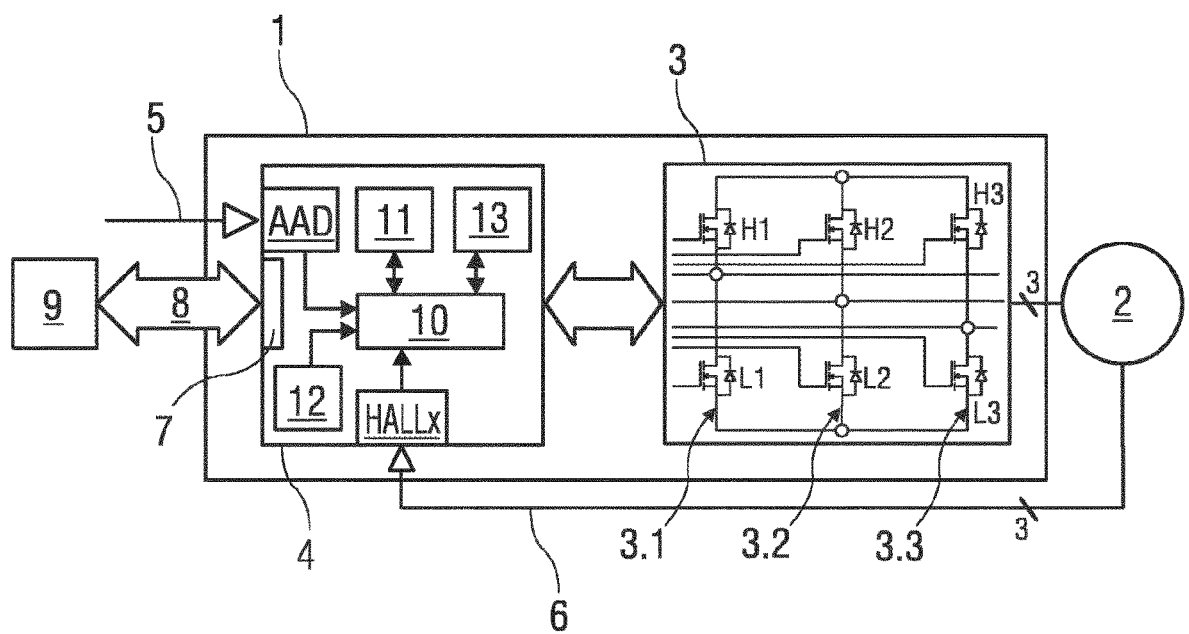
FIG. 1 shows a block diagram of a motor control apparatus for a brushless DC motor.

FIG. 1 shows a block diagram of a motor control apparatus 1 for a three-phase brushless DC motor 2.

The motor control apparatus 1 comprises a power converter 3 which has an electrical half-bridge 3.1, 3.2, 3.3 for each phase of the brushless DC motor 2. Each half-bridge 3.1, 3.2, 3.3 has a first electronic switch H1, H2, H3, a second electronic switch L1, L2, L3 and a bridge arm which is connected to the respective phase of the brushless DC motor 2.

The first electronic switches H1, H2, H3 are connected to a positive pole of a voltage supply for the power converter 3. The second electronic switches L1, L2, L3 are connected to a negative pole of the voltage supply for the power converter 3. The electronic switches H1, H2, H3, L1, L2, L3 are each, for example, in the form of a MOSFET (metal oxide semiconductor field effect transistor) or alternatively in the form of an IGBT (insulated gate bipolar transistor).

The motor control apparatus 1 also comprises an application-specific integrated circuit 4 for actuating the electronic switches H1, H2, H3, L1, L2, L3. The application-specific integrated circuit 4 has a first interface AAD for receiving an error signal 5 for signaling a safety-relevant malfunction, a second interface HALLx for receiving at least one sensor signal 6, for example at least one Hall sensor signal, indicating a rotor position of the rotor of the brushless DC motor 2, and at least one further interface 7 for receiving motor control signals 8. The motor control signals 8 are generated by a programmable control unit 9 which controls the application-specific integrated circuit 4 in an error-free normal mode. The motor control signals 8 are, for example, pulse width modulation signals for commutating the electronic switches H1, H2, H3, L1, L2, L3 in a manner controlled by pulse width modulation.

The application-specific integrated circuit 4 is designed to change the power converter 3 to a defined final operating state High_Z, in which all electronic switches H1, H2, H3, L1, L2, L3 are switched off and which causes a freewheeling state of the brushless DC motor 2, independently of the programmable control unit 9 after receiving the error signal 5. For this purpose, the application-specific integrated circuit 4 has an error handler 10 which is activated upon receiving the error signal 5 and whose method of operation is described in more detail below on the basis of FIG. 2. The application-specific integrated circuit 4 also has a counting register 11 for storing a count value AAD_Step_cnt for commutations which change the switching state of the power converter 3, a braking bit register 12 for setting a braking bit AAD_Brake, and a timer 13.

Figure 2:
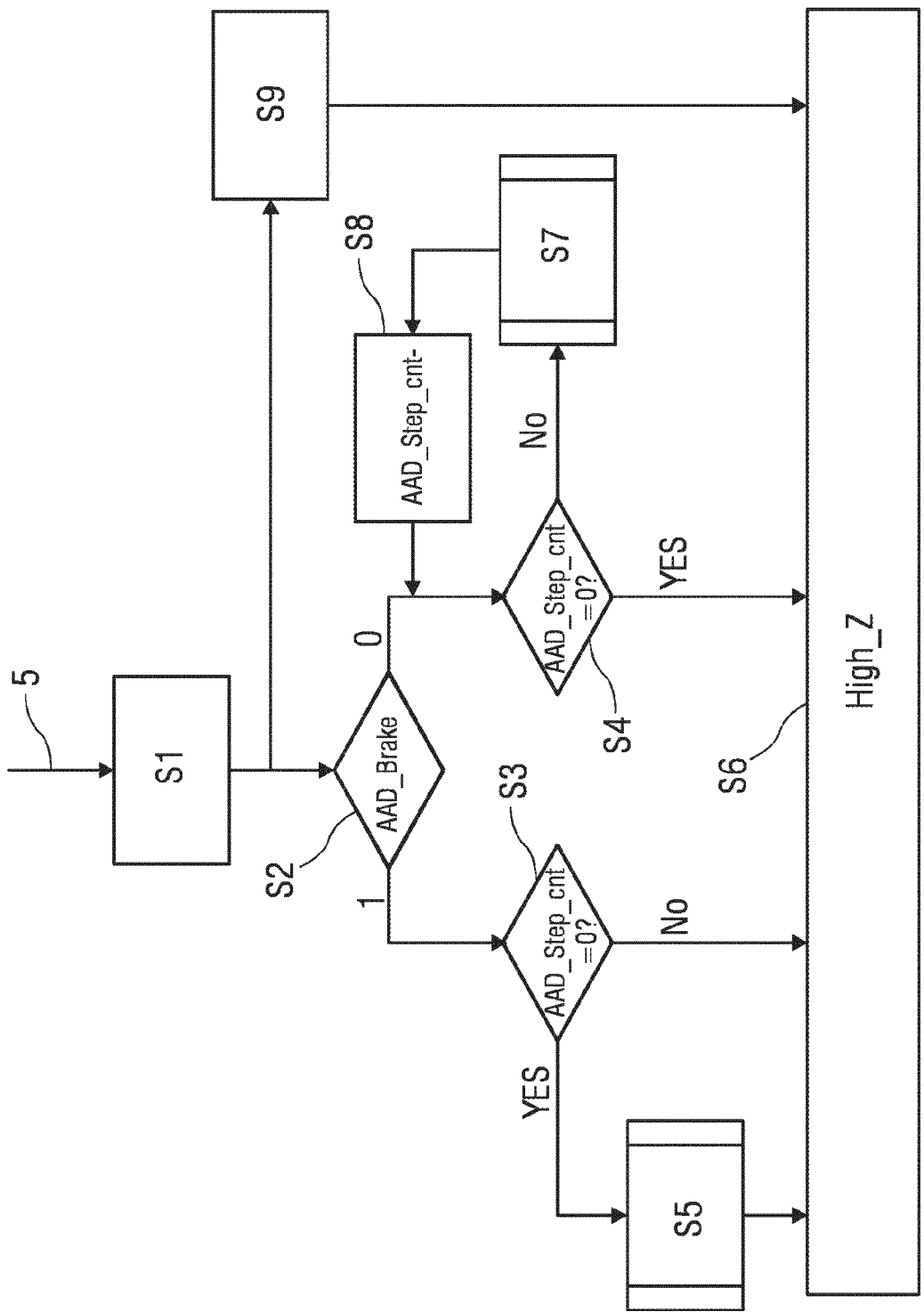
FIG. 2 shows a flowchart of a method for operating a brushless DC motor in the event of an error.

FIG. 2 shows a flowchart of a method with method steps S1 to S9 for operating the brushless DC motor 2 after receiving the error signal 5.

In a first method step S1, the error handler 10 is activated and the processing of the motor control signals 8 generated by the programmable control unit 9 is suspended. The subsequent method steps S2 to S9 are controlled by the error handler 10 independently of the programmable control unit 9. After the first method step S1, a second method step S2 and a ninth method step S9 are carried out.

The braking bit register 12 is read in the second method step S2. If the braking bit AAD_Brake is set, that is to say if AAD_Brake=1, the method is continued with a third method step S3. Otherwise, that is to say if AAD_Brake=0, the method is continued with a fourth method step S4.

The third method step S3 checks whether the count value AAD_Step_cnt is zero. If this is the case, the method is continued with a fifth method step S5. Otherwise, the method is continued with a sixth method step S6.

In the fifth method step S5, the power converter 3 is changed to a braking mode for braking the brushless DC motor 2 for a defined braking period. In the braking mode, all second electronic switches L1, L2, L3 are switched on and all first electronic switches H1, H2, H3 are switched off in the normal case, and all first electronic switches H1, H2, H3 are switched on and all second electronic switches L1, L2, L3 are switched off in the exception of a short circuit between the first electronic switches H1, H2, H3 and the 5 phases of the brushless DC motor 2. The sixth method step S6 is carried out after the fifth method step S5.

The power converter is changed to the final operating state High_Z in the sixth method step S6.

The fourth method step S4 likewise checks whether the count value AAD_Step_cnt is zero. If this is the case, the method is continued with the sixth method step S6. Otherwise, the method is continued with a seventh method step S7.

In the seventh method step S7, the switching state of the power converter 3 is changed by means of a commutation and it is checked after the commutation whether the commutation has changed the rotor position of the rotor. An eighth method step S8 is carried out in the event of a change in the rotor position.

The count value AAD_Step_cnt is decremented by one in the eighth method step S8. The seventh method step S7 is carried out again after the eighth method step S8.

The timer 12 is started in the ninth method step S9. After the expiry of a defined period since starting the timer 12, the sixth method step S6 is carried out, that is to say the power converter 3 is changed to the final operating state High_Z after the expiry of the period provided that the power converter is not yet in the final operating state High_Z. This means that the power converter 3 is changed to the final operating state High_Z at the latest after the expiry of the period, in particular even when the eighth method step S8 is not carried out, for example because the rotor of the brushless DC motor 2 may be blocked and therefore cannot be rotated further.

The above-described exemplary embodiment of the invention can be modified and supplemented in various ways. In particular, it can be modified to the control of brushless DC motors 2 with a different number of phases in a manner which is obvious to a person skilled in the art.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

The invention claimed is:

1. A motor control apparatus for a three-phase brushless DC motor comprising
a power converter which has an electrical half-bridge having two electronic switches for each phase of the brushless DC motor;
an application-specific integrated circuit for actuating the electronic switches of the power converter, wherein the application-specific integrated circuit can be controlled by a programmable control unit in a normal mode, and having a first interface for receiving an error signal signaling a malfunction to change the power converter to a defined final operating state independently of the programmable control unit after receiving the error signal; and
wherein the application-specific integrated circuit comprises:
a braking bit register for setting a braking bit;
a counting register for storing a count value for commutations which change the switching state of the power converter; and
wherein the braking bit is set when the error signal is received, to immediately change the power converter to the final operating state when the count value is greater than zero and, before changing the power converter to the final operating state, to change the power converter to a braking mode for braking the brushless DC motor for a defined braking period when the count value is zero.

2. The motor control apparatus as claimed in claim 1, wherein the application-specific integrated circuit further comprises a second interface for receiving at least one sensor signal indicating a rotor position of a rotor of the brushless DC motor and wherein when the braking bit is not set and the count value is greater than zero when the error signal is received, the application-specific integrated circuit changes the switching state of the power converter with at least one commutation before changing the power converter to the final operating state and checks after each at least one commutation whether the at least one commutation has changed the rotor position of the rotor and decreases the count value by one in the event of a change in the rotor position until the count value is zero.

3. The motor control apparatus as claimed in claim 1, wherein the application-specific integrated circuit has a timer and starts the timer after receiving the error signal and to change the power converter to the final operating state after the expiry of a defined period since starting the timer.

4. The motor control apparatus as claimed in claim 1, wherein all electronic switches are switched off in the final operating state of the power converter.

5. A method for operating a three-phase brushless DC motor using a motor control apparatus comprising
connecting each phase of a brushless DC motor to an electrical half-bridge of a power converter;
actuating electronic switches of the power converter using an application-specific integrated circuit,
controlling the application-specific integrated circuit with a programmable control unit in a normal mode;
receiving at a first interface of the application-specific integrated circuit an error signal signaling a malfunction to change the power converter to a defined final operating state;
changing the power converter is to the defined final operating state with the application-specific integrated circuit independently of the programmable control unit after receiving the error signal;
setting a braking bit with a breaking bit register of the application-specific integrated circuit when an error signal is received;
storing a count value for commutations in a counting register of the application-specific integrated circuit which changes the switching state of the power converter;
changing the power converter to final operating state with the application-specific integrated circuit immediately when the count value is greater than zero; and,
changing the power converter to a braking mode for braking the brushless DC motor for a defined braking period when the count value is zero.

6. The method as claimed in claim 5 further comprising:
receiving at a second interface of application-specific integrated circuit at least one sensor signal indicating a rotor position of a rotor of the brushless DC motor, and
changing the switching state of the power converter with the application-specific integrated circuit before changing the power converter to the final operating state by at least one commutation when the braking bit is not set and the count value is greater than zero when the error signal is received;
checking after each at least one commutation whether the commutation has changed the rotor position; and
decreasing the count value by one in the event of a change in the rotor position until the count value is zero.

7. The method as claimed in claim 5, further comprising starting a timer of the application-specific integrated circuit after receiving the error signal, and wherein the changing of the power converter is changed to the final operating state after the expiry of a defined period since starting the timer.

8. The method as claimed in claim 5, wherein all electronic switches are switched off in the final operating state of the power converter.

\* \* \* \* \*